Figure 1:
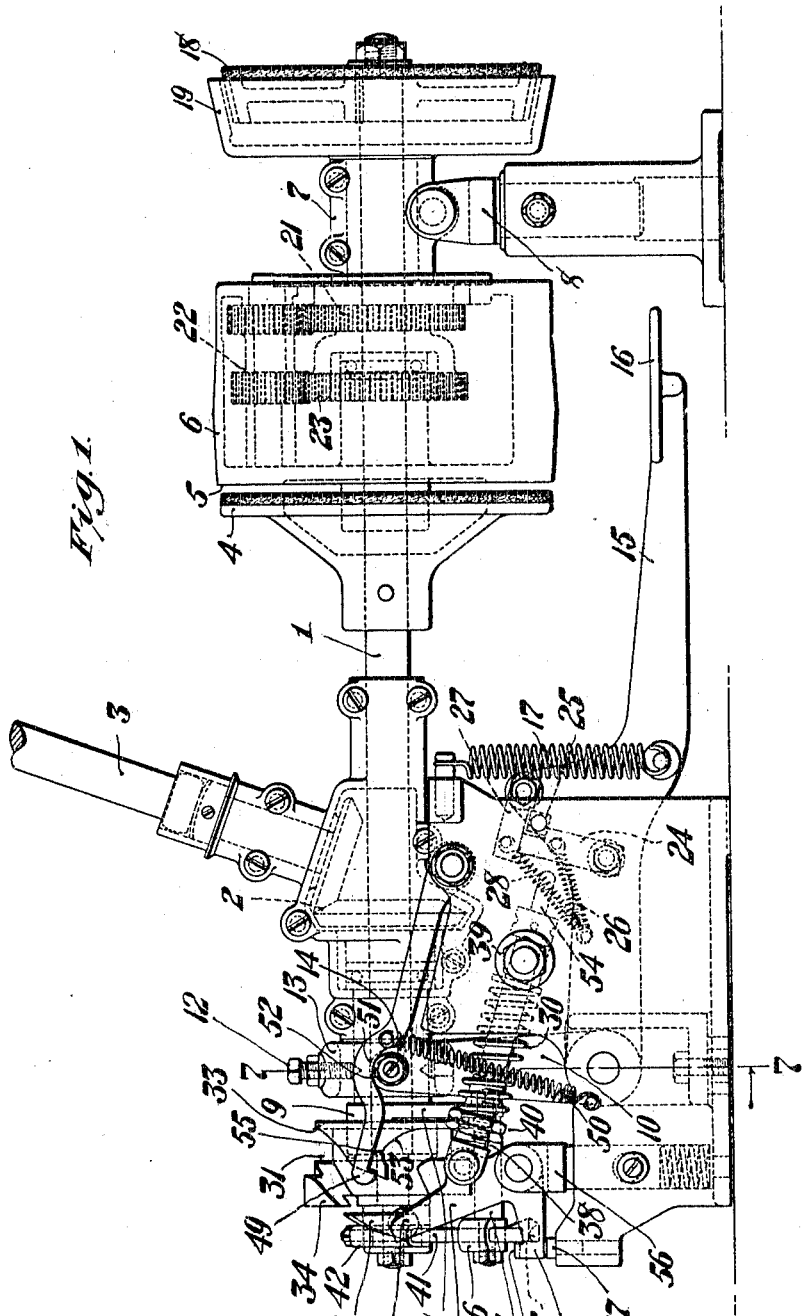

L. E. TOPHAM.
DRIVING AND STOPPING MECHANISM.
APPLICATION FILED NOV. 11, 1910.

1,099,325.

Patented June 9, 1914.

3 SHEETS—SHEET 2.

Witnesses:
E. C. Wurdeman
K. D. McPhail

Inventor:
Laurence E. Topham

L. E. TOPHAM.
DRIVING AND STOPPING MECHANISM.
APPLICATION FILED NOV. 11, 1910.

1,099,325.

Patented June 9, 1914

3 SHEETS—SHEET 3.

UNITED STATES PATENT OFFICE.

LAURENCE E. TOPHAM, OF BEVERLY, MASSACHUSETTS, ASSIGNOR TO UNITED SHOE MACHINERY COMPANY, OF PATERSON, NEW JERSEY, A CORPORATION OF NEW JERSEY.

DRIVING AND STOPPING MECHANISM.

1,099,325.  Specification of Letters Patent.  Patented June 9, 1914.

Application filed November 11, 1910. Serial No. 591,792.

*To all whom it may concern:*

Be it known that I, LAURENCE E. TOPHAM, a citizen of the United States, residing at Beverly, in the county of Essex and State of Massachusetts, have invented certain new and useful Improvements in Driving and Stopping Mechanism; and I do hereby declare the following to be a full, clear, and exact description of the invention, such as will enable others skilled in the art to which it appertains to make and use the same.

The invention relates to driving and stopping mechanism adapted for use upon machines in which the operating parts are comparatively heavy and are driven at a high rate of speed. It has heretofore been customary to provide machines of this character with a friction brake for overcoming the momentum of the moving parts, and to provide stopping devices which are brought into engagement before the relative slip between the members of the brake has ceased and operate to stop the machine at a certain point in the cycle of operations performed by the operating parts. Owing to the unavoidable variation in the action of a friction brake, even under the most favorable conditions, the brake does not overcome the momentum of the moving parts sufficiently to avoid undue shock and jar in stopping the machine when the slip between the members of the brake is greater than normal, and there is always danger that the machine will be brought to rest before the stop devices are brought into engagement when the slip between the members of the brake is considerably less than normal. The variation in the action of the friction brake is increased in case the driving mechanism for the machine is such that the machine may be stopped when driven at different speeds. In such case the friction brake must be set so that the stop devices will be brought into engagement if the machine is stopped when running at its slowest speed. This results in an imperfect and undesirable action if the machine is stopped when running at the high speed, since the brake does not offer sufficient resistance to the continued movement of the parts, and does not slow them down sufficiently before the stop devices are brought into engagement.

It is the object of the present invention to overcome these objections to the prior constructions, and to provide mechanism which will act in an efficient and uniformly reliable manner in stopping the driven machine at a definite point in its operation, whether driven at a high rate of speed or driven at widely varying speeds. To these ends the invention contemplates the provision of a friction brake which is applied when the driving mechanism is thrown out of operation, and mechanism for continuing the movement of the driven parts at a slow speed after the braking action of the brake ceases, to bring the machine to stopping position. With this construction the brake may be so adjusted that the braking interval extends through a considerable portion of a revolution of the driven parts, and the stop devices will be brought into engagement at the proper speed for their efficient and uniform action without regard to variations in the action of the friction brake caused by variations in the friction between the parts, or by variations in the speed of the machine at the time the brake is applied. Any suitable mechanism may be employed for continuing the movement of the driven parts at a slow speed, but it is preferred to effect this movement by imparting to the brake a slow rotary movement. It is also preferred to apply the brake with gradually increasing pressure, so that a more gradual slowing down of the driven parts is secured, although these features are not essential to the broader features of the invention.

The features of invention outlined above, as well as the further features which will be referred to in the claims, will be understood from an inspection of the accompanying drawings, and the following detailed description of the mechanism illustrated therein.

Figure 2:
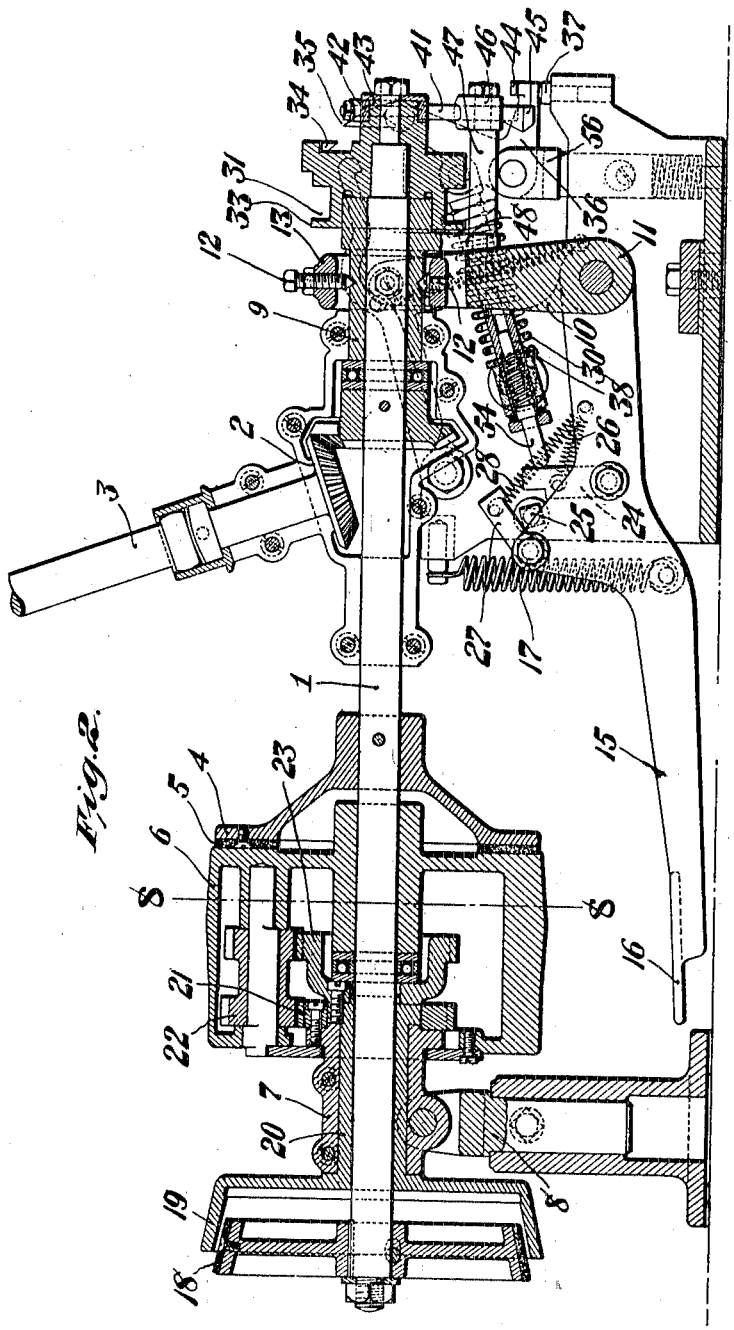
Figure 3:
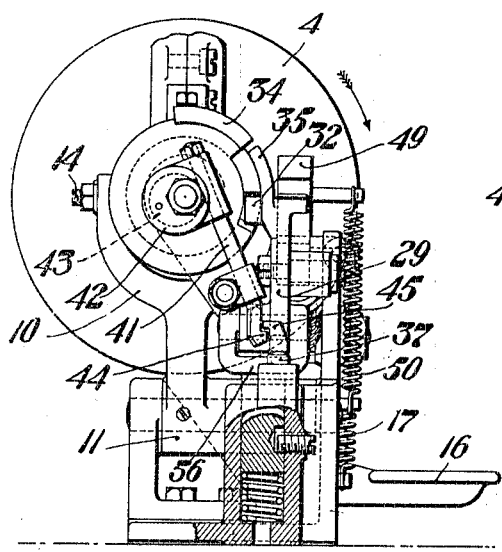
Figure 4:
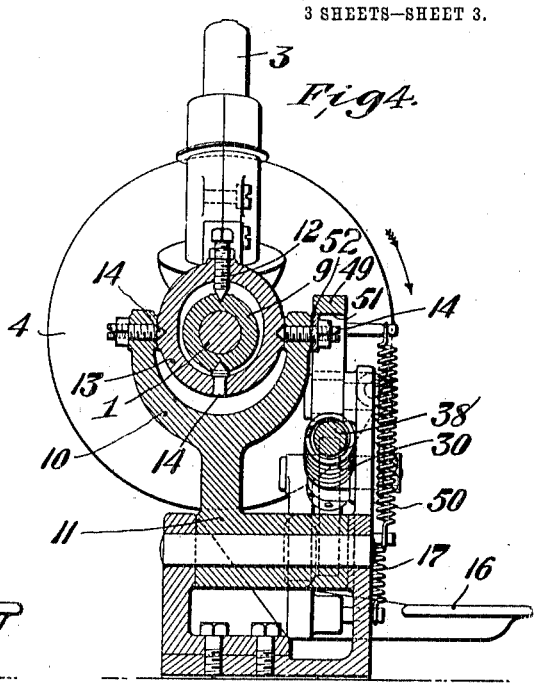
Figure 5:
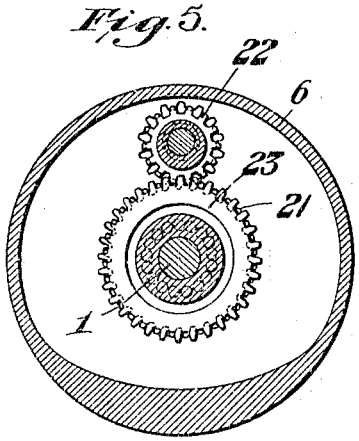
Figure 6:
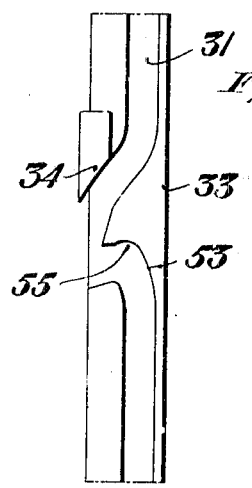

In the drawings Figure 1 is a side elevation of a driving and stopping mechanism embodying the invention in its preferred form; Fig. 2 is a vertical sectional elevation taken through the axis of the driven shaft; Fig. 3 is an end elevation looking toward the left in Fig. 1; Fig. 4 is a sectional view on line 7—7, Fig. 1; Fig. 5 is a sectional view on line 8—8, Fig. 2; and Fig. 6 is a view showing the development of the cam for applying the brake and throwing the stopping devices into action.

In the mechanism shown in the drawings, motion is transmitted to the machine or parts to be driven from a shaft 1 which is connected with the operating parts of the machine through bevel gears 2 and a connecting shaft 3. The driving mechanism for the shaft 1 comprises a friction clutch disk 4 secured to the shaft and arranged to engage a friction surface 5 formed on the end of a driving pulley 6. The shaft is supported at one end in a bearing 7 pivotally mounted upon a standard 8, and is supported at the other end in a bearing 9 which is carried by a yoke 10 formed on one arm of a bell crank lever 11. The bearing is supported upon centers 12 secured in a ring 13 which is in turn carried upon centers 14 secured in the arms of the yoke 10. The other arm 15 of the bell crank lever is provided with a treadle 16 by which the operator may shift the shaft 1 longitudinally to bring the clutch members 4 and 5 into engagement, and thus throw the driving mechanism into operation. By varying the pressure on the treadle 16 the operator may regulate the friction between the members 4 and 5 to vary the speed at which the shaft 1 and other driven parts are driven. The treadle is acted upon by a spring 17 which tends to throw the treadle and bell crank lever in a direction to disengage the driving clutch and thus throw the driving mechanism out of operation. In throwing the driving mechanism into operation the operator depresses the treadle against the tension of the spring 17, and upon the release of the treadle the spring 17 acts to throw the driving mechanism out of operation.

When the driving mechanism is thrown out of operation the momentum of the driven parts is overcome by the relative slip between the members 18 and 19 of a braking and slow speed driving clutch which first acts as a friction brake to slow down the driven parts, and then acts as a driving clutch to move the shaft 1 at a slow speed to stopping position. When the members 18 and 19 are brought into engagement there is more or less slip between them, the extent of which will vary with the speed at which the driven parts are running at the time the driving mechanism is thrown out of operation. The momentum of the driven parts will therefore be gradually overcome and their speed reduced without undue shock or jar. In order that the driven parts may be stopped at a definite point without regard to the amount of slip between the members 18 and 19, stopping devices are provided for determining the position to which the shaft 1 and connected parts are moved by the slow speed clutch after its braking action has ceased. The mechanism for driving the member 19 of the clutch comprises differential gearing for transmitting a slow rotary movement from the pulley 6 to a sleeve 20 on which the member is secured.

The differential gearing comprises a fixed gear 21 secured to the bearing 7, a quill gear 22 carried by the pulley 6, and a gear 23 secured to the sleeve 20. The gear 21 is slightly smaller than the gear 23, so that the sleeve 20 will be driven at a very slow speed in the same direction as the pulley 6 as the quill gear 22 is carried around the gears 21 and 23 by the rotation of the pulley.

The normal position of the parts when the shaft and other connected driven parts are at rest, is shown in Fig. 1. At this time the driving clutch and slow speed braking clutch are both disengaged, and the treadle lever is held in position against the tension of the spring 17 by a latch 24 pivoted on the lever and arranged to underlie a lug 25 on the frame. The latch is operated upon by a spring 26 which tends to disengage it from the lug 25, and is held in engagement with the lug by a retaining latch 27 pivoted on the treadle lever and held in engagement with the upper end of the latch 24 by a spring 28. When the treadle is depressed to engage the driving clutch and start the machine, the latch 27 is disengaged from the latch 24, so that the latch 24 is retracted, as indicated in Fig. 2. The operator may now vary the speed of the shaft 1 and driven parts by varying the pressure on the treadle.

When the machine is to be stopped, the operator releases the treadle and the spring 17 shifts the shaft 1 longitudinally to disengage the driving clutch, engage the members of the braking clutch and throw the stopping devices into action. The spring 17 might be relied upon to apply the braking clutch, but it is preferred to employ a comparatively light spring, the tension of which may be readily overcome by the operator, and to provide a heavy spring and connected mechanism thrown into operation when the treadle is released, for applying the braking clutch. It is also preferred to so construct this mechanism that the pressure with which the braking clutch is applied will be gradually increased to effect a more gradual slowing down of the driven parts.

In the construction shown, the devices for applying the braking clutch and stopping the shaft 1 in a definite position, comprise a bell crank lever 29 which is acted upon by a heavy spring 30, and a cam groove 31 arranged to engage a roll 32 on the lever when the shaft 1 is shifted longitudinally. The cam groove 31 is formed in a cam drum 33 secured to the shaft 1, and in addition to the cam groove 31, the drum is provided with a cam lug 34 adapted to engage a finger 35 on the end of the bell crank lever. The spring 30 acts to hold the bell crank lever in normal position with its lower arm 36 in engagement with a fixed stop 37. The spring 30 surrounds a rod 38, one end of which is pivoted to the bell crank lever, and the other end of which is mounted to slide through a pivotally supported bearing 39. The spring is interposed between the bearing and nuts 40 which may be adjusted on the rod to regulate the tension of the spring. When the driving clutch is engaged, or when the driving clutch is out of engagement and the parts are at rest (Fig. 1), the cam lug 34 is at the right of the finger 35 on the bell crank lever 29, and the finger is therefore out of the path of the cam lug. When the treadle is released to stop the driven parts, the longitudinal movement of the shaft 1 toward the left in Fig. 1 brings the cam lug 34 into position to engage the finger 35. If the shaft 1 is shifted to the left just as the point of the cam lug 34 is about to pass the point of the finger 35, these points might be brought into engagement and the proper operation of the device be thus interfered with, or the parts broken. Safety devices are therefore provided which will prevent the longitudinal movement of the shaft toward the left in such case until the point of the cam has passed the end of the finger, and these devices are also utilized to swing the bell crank lever carrying the finger 35 toward the right just before the cam 34 reaches the finger, so that the proper engagement of these parts is insured. These devices in the construction shown consist of a rod 41 the upper end of which is secured to a strap 42 surrounding an eccentric 43 on the end of the shaft 1, and the lower end of which is provided with a hook or shoulder 44 arranged to engage a projection 45 on the end of the arm 36 of the bell crank lever. The rod 41 is guided in a bearing 46 which is pivotally supported upon the end of a stud 47 (Fig. 2). The stud 47 is secured in the end of an arm 48 which projects radially from the bearing 9. While the shaft 1 is rotating, the rod 41 is continuously reciprocated and oscillated by the eccentric 43. While the driving clutch is in engagement, however, the lower end of the rod is to the right of the projection 45 on the end of the bell crank lever, and the rod moves idly. When the shaft 1 is shifted toward the left in stopping the machine, the lower end of the rod 41 will strike against the projection 45 in case the shaft is moved at the instant that the point of the cam 34 is passing the end of the finger 35, and will arrest the longitudinal movement of the shaft until the point of the cam has passed the end of the finger. The lower end of the rod will then move up above the projection 45, so that the longitudinal movement of the shaft may be completed and the brake members brought into engagement. The movement of the rod then carries its lower hooked end down below the projection 45, so that the hooked end will engage the projection and rock the bell crank lever toward the right when the lower end of the rod rises. The parts are so timed that the bell crank lever is thus rocked just before the point of the cam 34 reaches the end of the finger 35. Now as the cam drum 33 rotates the cam 34 acts against the finger 35 to swing the bell crank lever toward the right in Fig. 1. This movement of the bell crank lever is resisted by the spring 30 so that the action of the cam on the end of the bell crank lever tends to press the members of the slow speed braking clutch together with a pressure depending upon the tension on the spring 30.

The movement of the bell crank lever toward the right brings the roll 32 on the lever into the end of the cam groove 31, so that this cam groove continues to move the bell crank lever toward the right, increasing the tension on the spring 30 and therefore increasing the pressure with which the braking members are forced together. The movement of the bell crank lever by the cam 31 brings the upper end of the lever into position to be engaged by the hooked end of a latch 49. The latch is connected with a spring 50 which tends to force it downward into position to engage the bell crank lever, and the latch is curved at 51 to form a cam surface which coöperates with a projecting disk 52 secured to the end of the treadle yoke 10. After the shaft 1 has made about three-fourths of a revolution it is shifted toward the right to disengage the clutch members by the cam surface 53 formed near the rear end of the cam groove 31. While this cam surface is acting on the roll 32, the bell crank lever carrying the roll is held from movement toward the left by the latch 49. This movement of the shaft 1 disengages the clutch members and depresses the treadle, so that the latch 24 is brought down into position to engage the lug 25. The latch is forced forward into latching position against the tension of the spring 26 by a spring plunger 54 mounted in the end of the rod 38. This plunger is forced against the latch by the movement of the rod 38 when the bell crank lever is shifted toward the right by the cam 31, the spring back of the plunger yielding as the rod is moved. The spring back of the plunger is stronger than the spring 26, so that it will force the latch forward when the shaft 1 is moved to the right by the cam 53. The latch 27 engages the latch 24 and retains it in position after the plunger 54 is disengaged from the latch. The movement of the shaft 1 toward the right by the cam 53 brings the stop shoulder 55 into engagement with the roll 32, so that the rotation of the shaft and driven parts is arrested. The movement of the shaft by the cam 53 also carries the disk 52 on the treadle yoke against the cam surface 51 on the latch 49, so that the latch is raised to release the bell crank lever carrying the stop roll as the stop shoulder engages the roll. The spring 30 immediately swings the bell crank lever toward the left, disengaging the stop roll from the stop shoulder 55 and returning the lever to normal position with the arm 36 against the stop 37. The parts are now in the normal position shown in Fig. 1, with the driving shaft and connected driven parts at rest in a position determined by the stop shoulder 55 and stop roll 32. The blow of the stop shoulder 55 upon the stop roll 32 may be cushioned by mounting the bell crank lever carrying the roll in a spring supported plunger 56. The downward movement of this plunger when the roll is engaged by the shoulder 55 may be utilized to disengage the latch 49 from the lever, but the positively acting cam is preferably employed.

In the construction described, the shaft 1 makes approximately three-fourths of a revolution after the braking clutch is applied by the action of the spring 30, before the shaft is brought to rest by the engagement of the stop devices. By adjusting the braking spring 30, the friction between the braking clutch members may be regulated so that there will be sufficient slip between the members to insure the proper slowing down of the driven parts, without undue shock or injury thereto when the parts are driven at the highest speed. The interval between the applying of the brake and the engagement of the stop devices is sufficient to enable the braking action to be completed before the stop devices are brought into engagement, and the stop devices will be brought into engagement without undue shock or jar after the braking action has ceased, by the slow rotary movement of the braking clutch members. The point in the rotation of the shaft 1 at which the braking action of the clutch ceases will vary considerably even if the speed is the same each time the driving mechanism is thrown out of action. Any variation in the braking action will not affect the accuracy with which the driven parts are stopped, since the parts will be brought to stopping position by the continued rotation of the shaft although the braking action ceases before this point is reached. If the driving mechanism is thrown out of operation when the parts are being driven at a comparatively slow speed, there will be less slip between the clutch members. The driven parts will be brought accurately into stopping position in this case as before by the slow rotation of the clutch after its braking action has ceased.

While it is preferred to employ the specific construction and arrangement of parts shown and described, it will be understood that this construction and arrangement is not essential, and may be varied and modified without departing from the invention.

Having explained the nature and object of the invention, and specifically described a form of mechanism in which it may be embodied, what I claim is:—

1. A driving and stopping mechanism, having, in combination, a main driving mechanism, braking and stopping mechanisms thrown into operation when the driving mechanism is thrown out including means for insuring a material braking interval, and for bringing the driven parts to stopping position after the braking action has ceased, substantially as described.

2. A driving and stopping mechanism, having, in combination, a driving mechanism, stopping devices for stopping the driven parts in a definite position, a brake, mechanisms acting automatically to gradually apply the brake and to continue the movement of the driven parts to bring the stopping devices into engagement after the braking action of the brake has ceased, substantially as described.

3. A driving and stopping mechanism, having, in combination, a driving mechanism, a braking clutch, mechanisms for applying the braking clutch when the driving mechanism is thrown out including means for insuring a material braking interval, and for actuating the clutch to bring the driven parts to stopping position after the braking action has ceased and for stopping the driven parts, substantially as described.

4. A driving and stopping mechanism, having, in combination, a driving mechanism, a braking clutch, mechanisms for applying the braking clutch when the driving mechanism is thrown out including means for insuring a material braking interval, for actuating the clutch to drive the driven parts at a slow speed after the braking action of the clutch has ceased, and for disengaging the braking clutch and arresting the driven parts, substantially as described.

5. A driving and stopping mechanism, having, in combination, a friction driving clutch, devices under the control of the operator for actuating the clutch to vary the speed of the driven parts, a braking clutch, mechanisms for applying the braking clutch when the driving clutch is disengaged including means for insuring a material braking interval, and for bringing the driven parts to stopping position after the braking action of the braking clutch has ceased and for stopping the driven parts, substantially as described.

6. A driving and stopping mechanism, having, in combination, a driving mechanism thrown into and out of operation by the operator, stopping devices for stopping the driven parts in a definite position, mechanisms for applying a brake at least a predetermined interval before the stopping devices operate, and for continuing the movement of the driven parts to bring the driven parts to stopping position after the braking action of the brake has ceased, substantially as described.

7. A driving and stopping mechanism, having, in combination, a driving mechanism thrown into and out of operation by the operator, stopping devices, mechanism acting to apply a brake at least a predetermined interval before the stopping devices are engaged, and acting independently of the relative slip between the brake members for bringing the stopping devices into operation, substantially as described.

8. A driving and stopping mechanism, having, in combination, a friction clutch, a treadle for operating the clutch, stopping devices, mechanism thrown into action upon the release of the treadle for automatically applying a brake with a gradually increasing pressure, and for continuing the movement of the driven parts until arrested by the stopping devices, substantially as described.

9. A driving and stopping mechanism, having, in combination, a shaft, a clutch for driving the shaft, a braking clutch member on the shaft, a coöperating clutch member, mechanism for slowly rotating the latter member, means for disengaging the driving clutch and engaging the braking clutch members, and stopping devices thrown into action upon the engagement of the braking clutch members for disengaging said members and stopping the shaft, substantially as described.

10. A driving and stopping mechanism, having, in combination, driving mechanism, a brake, a treadle connected to control the driving mechanism, stopping devices, a brake spring, and connected mechanism thrown into operation when the treadle is released for applying the brake and increasing the tension of the spring, substantially as described.

11. A driving and stopping mechanism, having, in combination, a driving clutch, a brake, a treadle for controlling the driving clutch, a spring for disengaging the clutch and engaging the brake, an additional brake spring and connected mechanism for applying the brake when the treadle is released, substantially as described.

12. A driving and stopping mechanism, having, in combination, a driving mechanism, a brake, and mechanism for automatically applying the brake with a gradually increasing pressure when the driving mechanism is thrown out, substantially as described.

13. A driving and stopping mechanism, having, in combination, a main driving mechanism thrown into and out of operation by the operator, a low speed driving mechanism constructed to act as a friction brake when first thrown into operation and to then act to drive the machine at a reduced speed, mechanisms timed by the driven parts for throwing the low speed mechanism into operation when the main driving mechanism is thrown out, and for stopping the machine at a predetermined point in its operation, substantially as described.

14. A driving and stopping mechanism, having, in combination, a main driving mechanism, a low speed friction clutch thrown into operation when the main driving mechanism is thrown out, mechanisms timed by the driven parts for forcing the members of the friction clutch together to first slow down the machine and then drive it at a reduced speed, and for disengaging the low speed clutch and stopping the machine at a predetermined point in its operation, substantially as described.

15. A driving and stopping mechanism, having, in combination, a driving clutch, the engagement and disengagement of which is controlled by the operator, low speed friction clutch mechanisms including a timing cam connected with the driven parts for forcing the members of the low speed clutch together when the main clutch is disengaged, and for disengaging the low speed clutch and stopping the machine at a predetermined point in its operation, substantially as described.

16. A driving and stopping mechanism, having, in combination, a main driving mechanism, a low speed driving and braking mechanism, means for throwing said low speed driving and braking mechanism into operation, including a timing cam and means for rendering said cam active when the main driving mechanism is thrown out, substantially as described.

LAURENCE E. TOPHAM.

Witnesses:
CHESTER E. ROGERS,
LAURA M. GOODRIDGE.

Copies of this patent may be obtained for five cents each, by addressing the "Commissioner of Patents, Washington, D. C."